US005586741A

United States Patent [19]
Cuneo

[11] Patent Number: 5,586,741
[45] Date of Patent: Dec. 24, 1996

[54] CLIP-ON COMPUTER DISC HOLDER

[76] Inventor: Gregory S. Cuneo, 49 Balcom St., Mansfield, Mass. 02048

[21] Appl. No.: 439,252

[22] Filed: May 11, 1995

[51] Int. Cl.$^6$ .................................................. A47B 96/06
[52] U.S. Cl. ................. 248/229.26; 211/89; 248/231.81; 248/309.1; 248/316.7
[58] Field of Search ......................... 248/231.81, 229.16, 248/229.26, 316.7, 309.1; 211/89, 51

[56] References Cited

U.S. PATENT DOCUMENTS

| | | | |
|---|---|---|---|
| 2,306,174 | 12/1942 | Mallory | 248/229.26 |
| 4,351,505 | 9/1982 | Wickersham | 211/89 X |
| 4,948,022 | 8/1990 | VanDyke | 224/901 X |
| 5,489,078 | 2/1996 | Risley | 248/231.81 |

*Primary Examiner*—Ramon O. Ramirez
*Assistant Examiner*—Michael J. Turgeon
*Attorney, Agent, or Firm*—William Nitkin

[57] ABSTRACT

A device for storage of one or more computer discs, such device having a rear wall with a spring clip extending from the top of the rear wall toward the lower bottom of the rear wall to grasp a planar member, such as media, disposed between the rear wall and the spring clip. The front of the rear wall extends at its bottom to form a base, and the sides extend forward first to form side walls and then from such side walls inward to form left and right front walls, each with retention structure to hold the computer disc securely between the rear wall and the left and right front walls.

3 Claims, 1 Drawing Sheet

CLIP-ON COMPUTER DISC HOLDER

BACKGROUND OF THE INVENTION

1. Field of the Invention

The device of this invention resides in the area of structures that hold planar objects and more particularly relates to a clip-on structure made of a unitary piece of material designed to retain, in a preferred embodiment, a 3½ inch computer disc which structure is clipped to a side edge of a planar member such as, for example, a notebook or file.

2. Description of the Prior Art

It has long been considered desirable to be able to store computer discs in close proximity to other media such as notebooks, file folders and the like. To that end pockets which attach to planar surfaces have been developed such as U.S. Pat. No. 5,275,438 to Stuhl and U.S. Pat. No. 5,288,144 to Guderyon. Both of the structures of these patents are designed to adhere to flat areas, for example, on a file folder or notebook by an adhesive and provide a pocket into which a computer disc can be inserted. If such structures are removed, the self-adhesive is damaged and the structures cannot be easily or quickly reused. These devices can be made of paper or plastic construction. Another device for the storage of computer diskettes is disclosed in U.S. Pat. No. 4,940,142 to Behrens et al which device attaches to the edges of a computer data diskette. The Behrens et al device has a plurality of holes which can be engaged by the rings of a notebook binder so that a diskette can then be retained in the notebook and the device can be flipped from side-to-side in a manner similar to pages in a notebook.

SUMMARY OF THE INVENTION

It is an object of this invention to provide a new type of computer disc holder which can be easily clipped onto a planar object such as the side edge of a notebook or the top edge of a file and be easily removed therefrom. This clip-on feature has an advantage over the prior art structures which must be adhered by adhesive to a surface and cannot be quickly and easily removed therefrom. The device of this invention can be quickly removed for reuse on a variety of planar members.

It is a further object of this invention to provide such computer disc holder in an economical and easy-to-manufacture form. To this end the structure of this invention can be formed of a unitary piece of planar material into the shape as described below. The structure can be composed of metal or molded of plastic. Due to its simplicity of design the structure of this invention is very economical to produce.

The device of this invention has a rear wall that is approximately the size of the computer disc to be retained therein. The rear wall at its top forms a bend and extends rearward and downward to form a curved spring clip tensioned against the back surface of the rear wall. A spring clip tip located at the end of the sping clip is directed away from the rear wall so that a planar member can be easily slid between the spring clip and the back surface of the rear wall and then pushed upwards between the rear wall and the curved spring clip until the planar member hits the underside of the bend. Extending perpendicularly forward from the bottom of the rear wall is an outwardly extending base. From the left and right sides of the rear wall are forwardly extending portions which form, respectively, left and right side walls. The left side wall and right side wall then extend inward to form, respectively, a left front wall and a right front wall. An L-shaped cut is made in each front wall to form a left retention clip and a right retention clip, which clips are bent rearwardly. The area bounded by the left and right side walls, the rear wall, the base and the left and right front walls define a disc storage area within which area one or more computer discs can be inserted and pushed downward until striking the base. The left and right retention clips act as spring members urging against and pushing the computer disc firmly against the front surface of the rear wall. After the computer disc is pushed all the way down and is stopped by the base, it is thus held in position in the device. The device can be installed and removed from any desired thin planar member such as written media and reinstalled for use over and over agin on other planar media. The computer disc(s) can be inserted or removed while the device is in place installed on such planar member such as the side edge of media, for example, a notebook, book cover, page, file and the like. The label on the outermost disc is easily viewable as the front walls of the device are disposed only over the side edges of the disc, leaving the central portion of the disc unobstructed from view.

DESCRIPTION OF THE PREFERRED EMBODIMENT(S)

Figure 1:
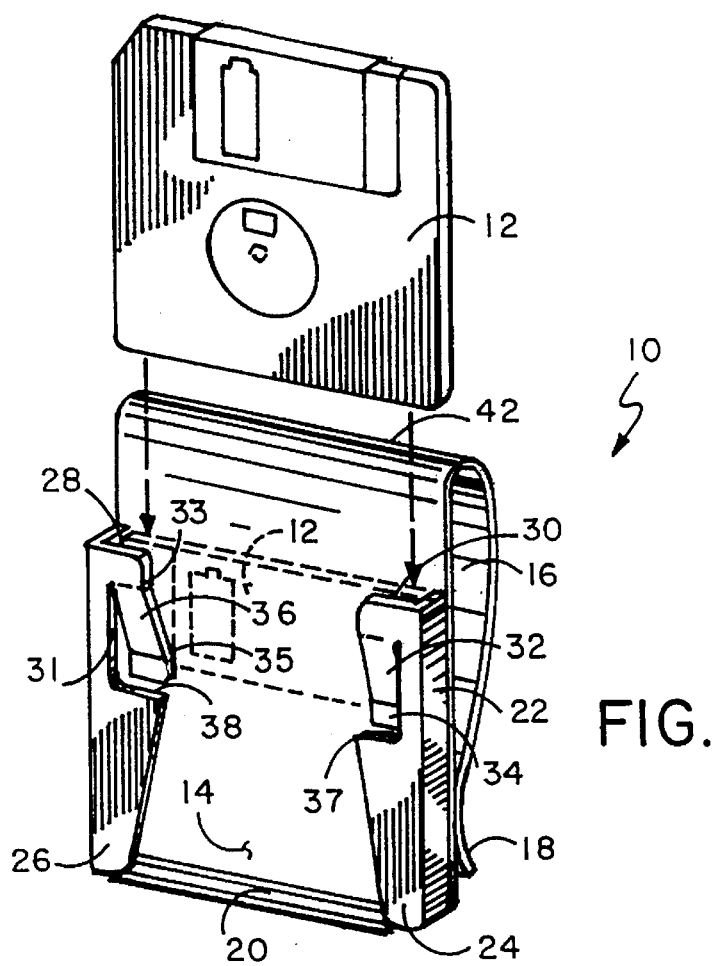
FIG. 1 illustrates a front perspective view of the device of this invention showing a computer disc about to be inserted into the disc storage area and showing in dotted lines such computer disc disposed therein after insertion.

FIG. 1 illustrates the clip-on computer disc holder 10 of this invention into which one or more computer discs 12 can be inserted, one behind the other. The invention can be made in any size depending on the size of the computer disc to be inserted. Such computer discs are generally thin, planar and rectangular; and the structure of this invention can be made to accommodate the standard 3½ inch disc currently popular but if made larger could accommodate a 5¼ inch floppy disc or even the carrying case for a CD ROM disc. The device of this invention can be used as a storage device for any planar structure of similar size and is not limited solely to the storage of computer discs.

The device of this invention in a preferred embodiment can be made of unitary construction. Seen in FIG. 1 is rear wall 14 which is rectangular and planar. The top of rear wall 14 curves rearwardly, forming bend 42, and then extends downwardly and slightly forward toward the back surface of rear wall 14 to form curved spring clip 16. At the bottom of curved spring clip 16 at clip junction 17 is a small rearwardly extending spring clip tip 18 that extends for a short distance. Between spring clip tip 18 and back of rear wall 14 is slipped whatever planar member, not shown, to which the device of this invention is to be mounted, and the device is advanced downward thereon as the planar member advances upward between curved spring clip 16 and rear wall 14 until the planar member comes in contact with bend 42. Holder 10 is securely retained on the planar member by the inherent spring tension of curved spring clip 16 at clip junction 17 against the planar member onto which the device of this invention is installed, sandwiching it firmly between rear wall 14 and spring clip 16. At the front of rear wall 14 is base 20 which extends outwardly perpendicularly from the bottom of rear wall 14. In a preferred embodiment each side of the rear wall is adapted to extend first forward to form left side wall 28 and right side wall 22 which side walls are perpendicular to rear wall 14. Left side wall 28 and right side wall 22 then extend inward to form, respectively, left front wall 26 and right front wall 24. A disc storage area 30 is defined in the area bounded by left side wall 28, rear wall 14, right side wall 22, right front wall 24, base 20, and left front wall 26 which disc storage area is slightly larger than the width and height of the computer disc to be stored therein. The depth of the side walls limits the number of discs that can be inserted in the disc storage area, one behind the other. When the device is manufactured for use with 3½ inch computer discs, the distance between left side wall 28 and right side wall 22 will be a little over 3½ inches to accommodate the width of such disc, and the distance between base 20 and the top of left side wall 28 and right side wall 22, respectively, will be approximately 3½ inches being the height of computer disc 12. The upper portion of each side wall can extend somewhat outward from rear wall 14 a greater distance than the distance that the lower portion of each side wall extends for ease of insertion of the computer disc. Left front wall 26 extends inwardly from left side wall 28 at approximately a 90-degree angle, and right front wall 24 extends inwardly from right side wall at approximately a 90-degree angle. These front walls extend inwardly toward one another a distance sufficient to enable them to be disposed in front of the side edges of computer disc 12 shown in dotted lines in FIG. 1 within disc storage area 30 to retain the disc within the disc storage area and to leave the central portion containing the disc label unobstructed so that it can be easily read. The front walls are wide enough so that an inwardly-facing, L-shaped cut can be made in proximity to the inside edges of each front wall, such as left cut 31 and right cut 37, to form, respectively, downwardly and rearwardly extending left retention member 36 and right retention member 32 having, respectively, at its ends left retention member tip 38 and right retention member tip 34 which tips are bent slightly forward. Left and right retention members 36 and 32 apply pressure, respectively, at left junction 35 and right junction 41 rearwardly against computer disc 12 to retain it in disc storage area 30. As seen in FIG. 1 left cut 31 defined in left front wall forms a free ended left retention member 36 which is bent rearward at left front bend 33 and extends at a rearward angle therefrom. At the bottom of left retention member 36 below left junction 35 is left retention member tip 38 bent in a forward direction so that left retention member 36 will not catch on the computer disc when the disc is removed from the disc storage area as such tip, being bent forward, will not come in contact with disc 12. Left junction 35 and right junction 41 are the portions of the device which contact the front of computer disc 12, and the computer disc can slide up or down under the left and right junctions without catching thereon. Similarly, right front wall 24 has L-shaped right cut 37, forming right retention member 32 from a portion of right front wall 24. Right retention member 32 is bent rearward at right front bend 39, contacting computer disc 12 at right junction 41 with right retention member tip 34 bent in a forward direction.

Figure 2:
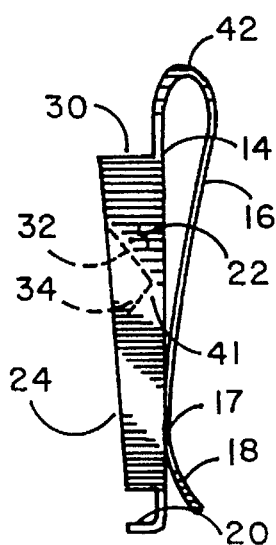
FIG. 2 illustrates a right side elevational view of the device of FIG. 1.

As seen in the right side view of FIG. 2, right retention member 32 is directed downward and rearward toward rear wall 14 and its right retention member tip 34 is bent forward at right junction 41 so as to provide a secure gripping of the computer disc at junction 41 to cause the disc to remain securely within the device and be removable therefrom by merely pulling it up and out of disc storage area 30.

Figure 3:
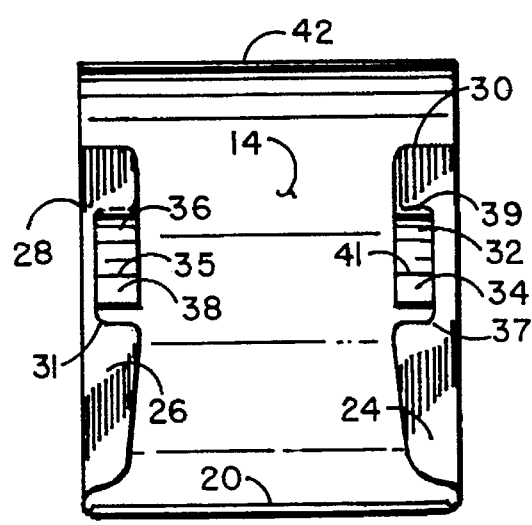
FIG. 3 illustrates a front elevational view of the device of FIG. 1 with no computer disc placed therein.

In the front view of FIG. 3 which shows the device of this invention with no computer disc stored therein are seen L-shaped left cut 31 and right cut 37 along with left retention member 36 and right retention member 32 which are directed to press against a computer disc, respectively, at left and right junctions 35 and 41.

The device of this invention in a preferred embodiment can be formed out of a unitary piece of metal such as thin stainless steel or it can be molded of plastic. It can also be made of non-unitary construction.

Although the present invention has been described with reference to particular embodiments, it will be apparent to those skilled in the art that variations and modifications can be substituted therefor without departing from the principles and spirit of the invention.

I claim:

1. A device for removably retaining on a planar member at least one planar computer disc having side edges, comprising:

a one-piece structure having a substantially planar rear wall, said rear wall having a left side, a right side, a top, a bottom, a front surface and a back surface;

a curved spring clip member having a top bend connected to said top of said rear wall, said spring clip member disposed extending downward, from said top bend's connection to said top of said rear wall, adjacent to said back surface of said rear wall and defining a planar member receipt area therebetween, said spring clip member urging toward said back surface of said rear wall for quick and easy installation and removal of said device from said planar member;

a left side wall and a right side wall, each extending a distance, respectively, from said left side and right side of said rear wall, said left side wall and right side wall being perpendicular to said rear wall;

a base extending forwardly and perpendicular from said bottom of said rear wall;

a left front wall and a right front wall extending, respectively, inwardly a distance and perpendicularly from said left side wall and said right side wall, said left front wall and said right front wall each having, respectively, an inside edge, and an unobstructed central opening defined between said inside edges of said left front wall, right front wall, and said base, said side walls and said front walls defining a storage area therebetween;

disc retention means formed from a portion of each front wall, said disc retention means biased to press against and releasably hold said computer disc placed within said storage area to allow for the quick and easy removal and reinsertion of said computer disc out of and into said storage area; and wherein said disc retention means comprise an L-shaped left cut having a lower portion thereof defined in said left front wall and an L-shaped right cut having a lower portion thereof defined in said right front wall, said lower portions each directed toward one another, said L-shaped left cut and said L-shaped right cut disposed in proximity to said inside edges, respectively, of said left front wall and said right front wall forming, respectively, a left retention member bounded by said L-shaped left cut and said central opening and a right retention member bounded by said L-shaped right cut and said central opening, each of said retention members bent toward said rear wall to contact, maintain pressure on and releasably hold said computer disc in said storage area.

2. The device of claim 1 wherein said left and right retention members each has an end portion which is bent at a frontward direction.

3. The device of claim 2 wherein said left and right front walls extend inward a distance sufficiently to be disposed over the side edges of said computer disc.

* * * * *